G. W. UPTON.
FISHING REEL.
APPLICATION FILED MAY 7, 1914.
1,212,288. Patented Jan. 16, 1917.
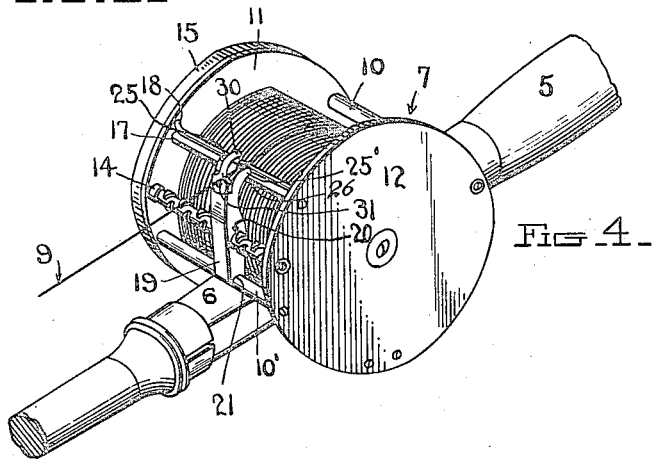
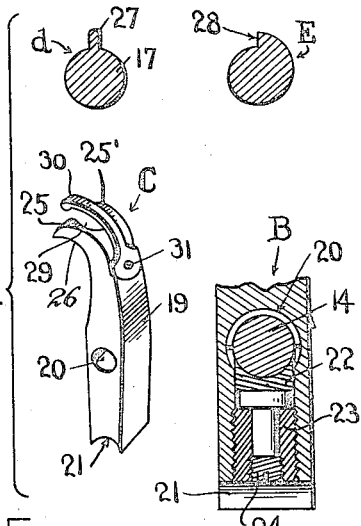
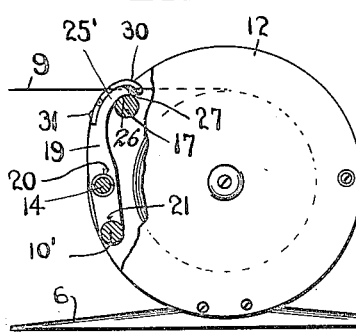
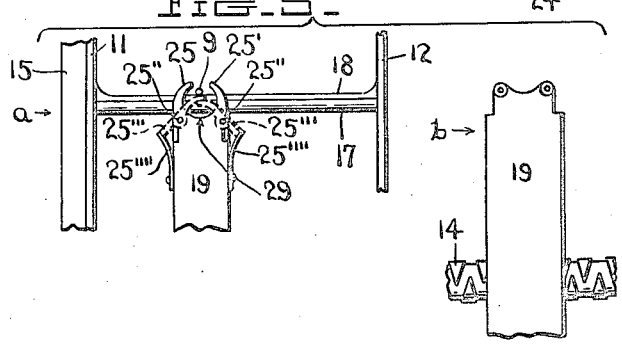
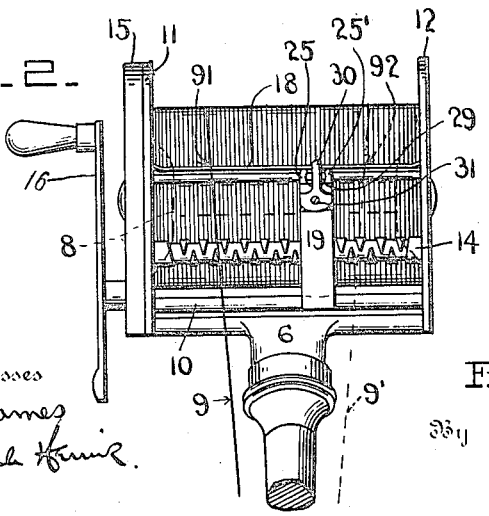
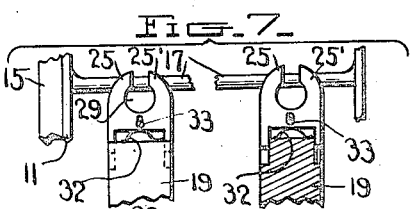
Witnesses
L. B. James
P. Cecil Kimmel
Inventor
George W. Upton
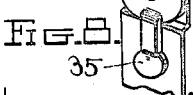
Attorney

UNITED STATES PATENT OFFICE.

GEORGE W. UPTON, OF WARREN, OHIO.

FISHING-REEL.

1,212,288.  Specification of Letters Patent.  Patented Jan. 16, 1917.

Application filed May 7, 1914. Serial No. 837,097.

*To all whom it may concern:*

Be it known that I, GEORGE W. UPTON, a citizen of the United States of America, residing at Warren, in the county of Trumbull and State of Ohio, have invented certain new and useful Improvements in Fishing-Reels, of which the following is a specification.

My invention relates to improvements in that class of fishing reels, called "level-winding" or "self-spooling" reels, in which provision is made for automatically distributing or laying a fishing line on the spool of the reel, more or less evenly, as it is being wound in and onto said spool, by mechanisms connected with the manually operated crank of the reel and the gears rotated thereby. In such reels one or more double threaded shafts extend in front of the spool and between the side plates of the reel, and are ordinarily rotated by transmission gears connected with the gear wheel of the reel; and a member movable along said shaft and bearing a loosely mounted pin which, traveling in the troughs between said double threads, carries said member back and forth with regularity from side to side of the reel. It is common practice to form the top of said member in the shape of a ring through which the line passes from the spool of the reel to the first guide of the rod to which the reel has been attached; or to use, instead of a ring, a pair of parallel wires extending perpendicularly to said threaded shafts, between which wires the line passes from the spool to said first guide. In that way, as said member is moved from side to side as the line is winding in, the sides of the ring, or the parallel wires acting alternately guide the line to and fro on said spool. In casting a bait to long distances, the line chafes on the inner sides of said ring or of said parallel wires, thereby frictionally retarding the length of the "cast" and also quickly wearing out the line and the ring or wires because of the nearness of the point of contact to the spool of the reel.

The objects of my invention are, first, to do away with the use of either such a ring or set of parallel wires; second, to permit the line to fly freely and untouched between the spool and the first guide of the rod while the bait is going out; third, to save the manufacturing cost of said ring or said wires and their attendant supports, retainers and guides, etc.; fourth, to prevent friction and wear of the line; fifth, in certain reels which I shall clearly describe and specify, to dispense with the exceedingly rapid movements of said member, said double threaded shaft and their operating mechanisms as the bait swiftly moves away, thereby greatly prolonging the life and usefulness of said parts, and sixth, to provide means for mechanically and automatically laying, or spooling the line on the spool of the reel again, after the cast, as the line is wound in. I attain those objects by the mechanism illustrated in the accompanying drawings, in which:—

Figure 1 shows a reel in perspective, attached to a rod handle (broken away) and with my invention attached. Fig. 2 is a front view of the same. Fig. 3 shows an elevation of the same in part broken away and partly in section. Fig. 4 illustrates certain details more or less enlarged. Fig. 5 shows a form of my invention for use on large reels which afford more room for it. Fig. 6 shows the most simple form for use on the cheapest reel. Figs. 7 and 8 show modifications.

Similar characters refer to like parts throughout the several views.

On a rod handle 5, the cross plate 6 of a reel 7 is firmly attached. On the spool 8 the line 9 is wound; its outer end having been carried forward through line guides (not shown) attached to the rod. Pillars 10, 10' connect the side plates of the reel, of which one is designated as the head-plate, 11, and the other as the tail-plate, 12; and a double threaded shaft 14 parallel to said pillars and journaled into said side plates, 11 and 12, passes through the head plate 11, under the cap 15, where it is provided with a gear wheel or other mechanism to mesh with or be rotated by the gear of the reel when the crank 16 is turned for the purpose of rotating the spool 8.

Above the shaft 14 and parallel to it I locate a rod 17 similar to a reel pillar, or it may be used as one, and slightly above it, in some reels I locate another rod 18 whose ends are elevated slightly where they join the head and tail-plate 11 and 12. The rods 17 and 18 can be made as one rod corresponding in shape to both as shown, or the rod 18 can be omitted and slightly elevated ends of the rod 17 may be provided to serve the purpose which will be clearly set forth below. A plate or piece of sheet metal may be used as well.

A line carrier 19 is perforated horizontally and is sleeved loosely at 20 on the threaded shaft 14 and is of a width approximately double that of the unthreaded metal left at each end of the shaft 14, which corresponds in length to the width of the flared portions of the flanges of the spool; so that the line when spooled will be carried evenly up to the peripheries of the spool flanges and the carrier 19 will travel until its sides will, alternately, just contact (and not more) with the inner faces of the plates 11 and 12 before starting to reverse or return.

The carrier 19 may preferably be supported (though it need not be of necessity) in any way at its bottom and in Fig. 4 (C) I have illustrated a simple and convenient way in which a semi-cylindrical groove 21, extending laterally, half-sleeves on the top of one of the pillars marked 10', (or on any rod especially positioned to receive it). I insert a loosely swiveled thread-traveler, 22, in a bore in the carrier 19 and retain it there adjustably in a threaded jacket 23, by a screw 24, Fig. 4 (B). The upper part of the carrier 19 above the threaded shaft 14, I curve slightly to correspond with the shape of the reel, and terminate its extremity in two prongs 25, 25', which may be of any shape, but which I show as curved downward to form rear edges 26, which will travel close to the rod 17 and, when used alone with it, should be slightly lower than its top surface in order that the line which is to pass over the top of the rod 17 will not touch the rear of, or get under the prongs 25, 25'. I make the tops 27, of said prongs higher than the rod 17 so that the outer side of one or the other of said prongs will be met by the line when it is stretched from the top of the rod 17 to the first guide of the fishing rod (not shown), depending upon which side of the carrier 19 the line has fallen on.

The auxiliary rod 18, whether touching the rod 17 or located a little higher and near it, affords an additional or precautionary safe-guard against the entrance of the line, when loose, between the rear edges 26 of the prongs 25, 25' and the rod 17 and under the carrier 19. Instead of the rod 18 one can form a longitudinally extending ear 27 (Fig. 4—d) on the top of the rod 17 or provide a rear vertical wall 28 along the back of the rod 17 as shown in section at (E), Fig. 4.

The use of the rod 17, as shown, or in any modified form, is a very important feature of my invention because, irrespective of other details, the introduction of such a horizontal guard (as rod 17 is) with its top higher than the rear edges of carrier 19, or any other device of the kind or for a like purpose, produces a positive retention of the line 9, when taut (as in winding it in or when holding a fish) above all entrance openings to the space behind or under the carrier 19, no matter whether the spool is full of coiled line or whether the axle of it only is covered, and such a provision is entirely new in fishing reel construction either of the class under consideration or of any class, kind or use. Wherefore, I claim such a rod, so located, in whatever form it may be made or used, as being of my original and sole discovery and invention.

After a cast has been made and one starts to retrieve the bait, the line 9 will fall and straighten out across the rod 17, and on one or the other side of the carrier 19, outside of either prong 25 or prong 25' and between it and the head plate 11 or the tail plate 12, as shown by the full line 9 or the broken line 9', Fig. 2, as at 91 or at 92, respectively.

If the line 9 crosses the rod 17 at 91, winding it in will cause the carrier, 19, to traverse the shaft 14 till the prong 25 strikes the line 9, at 91. Whereupon it will push it along till they both reach the head plate 11, normally; but I round the tops 27, (see Fig. 6) of said prongs 25, 25', making a gradual slope upward on their exterior faces while I leave their interior faces flat at their tops and convex them slightly at their bottom to form an open receptacle of the shape of a loop 29, such a formation, as the carrier moves over with the line on its outside, will cause the line to slide or climb up over the top 27 of the prong 25 and drop into said loop 29. Thereafter the line being between said prongs will be carried to and fro across the spool of the reel until the winding ceases. When the next cast is made the line will fly out of the opening between the prongs and run out without the friction ring guides or directing wires would cause. If the line 9' (Fig. 2) crosses the rod 17 at 92, on the other side of the carrier 19, the latter will carry it to the right (Fig. 1 or 2) until the elevated end of the rod 17 (or 18, if used) lifts it up so that it goes over prong 25' and between the two prongs of the carrier, where it will remain until another cast is made.

Thus far I have described my invention in its most simple form as diagrammatically illustrated in Fig. 6.

I desire it to be noted, also, that when the prongs 25, 25' are properly positioned, shaped and exteriorly rounded, the incoming line 9 will slide over either of them and fall into the loop 29 when the carrier brings it against the outside of either prong and the loop 29 will retain it. Therefore it is not imperative to elevate the top of the rod 17 (or 18 when it is used) at its ends, but by doing so the passing of the line over the prongs is made more positive and assured.

For the reason that on some rods the first line guide is located at a greater distance from the handle than is usual, on such rods the angle of the line from spool to guide being more obtuse, there is greater possibility of the line passing clear over both prongs of the carrier 19 instead of dropping into the loop 29. Wherefore I provide, for use when required, an extra element consisting of a tongue 30 rockingly attached on the front or carrier 19 near its top, as by a screw 31, and having its lower end flat to hold it measurably erect and pointing backward over the loop 29, but with rounded corners to allow it to rock slightly to right or left so the line can push it over sufficiently to leave space between it and either prong for the line to drop down into the loop 29. The tongue 30 being longer than either prong operates with either to prevent the line going on over the second one.

On large reels where more room can be taken advantage of and especially on reels the flanges of whose spools are deeply bell-shaped near their peripheries, and for which reason the line is not to be wound as close to the side plates as on reels with more vertical spool flanges, there is room for lateral movement of the prongs, of the carrier 19. Therefore, for such reels the prongs illustrated in Fig. 5 may be used, in which each prong is swiveled, on pivots 25″, 25″, having flat tail ends 25‴, 25‴, which strike the outside edges of carrier 19 to retain them erect as to exterior movement, but the ormation allows the line when coming from either side to knock down one prong and drop into the loop 29, whereupon the said first prong is restored to an erect position either by the greater weight of its end 25‴ or by a spring 25⁗.

Another simple arrangement of the prongs of the carrier 19 is shown in Fig. 7 in which they are made of one flat piece terminating in two prongs with the loop 29 between them. The whole piece can be dovetailed onto carrier 19, as shown, and have a weak spring 32 to elevate it after the line has pushed it down by rubbing over one of the prongs, or a vertical slot operating with a screw 33 can be substituted for the dovetail retainer.

In Fig. 8 I show an equivalent of the last described modification, in which the prongs, again made as one piece, are pivoted at 34 and carry a light weight 35 which erects them after the line has rocked them far enough to pass over one prong and into the loop 29 and before it can have passed over the second prong.

When a "free spool" reel is used such as the one covered by the claims of my Patent No. 820,326, in which, when the bait is cast, the spool is thrown out of mesh with the operating pinion, gear and handle, and consequently with the double threaded shaft 14, the latter does not revolve and the carrier, 19, does not move; so that without this, my present invention, there would be much friction of the line when going out since it would have to pass through a ring or between wires, perhaps located at one side of the reel while the major portion of the line, in that case, would pull off from the remote end of the spool, were this improvement not used.

Although I have described and referred to reels which are constructed with mechanical devices operated simultaneously with and by the turning of the handle of the reel, nevertheless there are several devices on the market, and more will follow, by means of which, when they are attached to or are used with other reels than those referred to and not containing said mechanisms, one can direct the incoming line from side to side of the spool by operating said device with the thumb or a finger of the hand not engaged in turning the crank.

It is apparent that my improvement consisting of the described line-supporting rod or cross bar, with or without turned up ends, and my novel, open ended, terminal or top end of the movable line carrier are equally applicable to such devices and therefore to use with any and all reels so equipped.

Wherefore I claim as being my invention:—

1. A line carrier for a fishing reel, adapted to travel from side to side in front of said reel, and having prongs and an intermediate line receiving space so formed as to permit one prong to pass under said line when it is being wound in, and prevent its passing over a second prong until the line is slackened, in combination with line elevating deflectors attached to the said sides of said reel, for the purpose set forth.

2. In a reel of the kind described, the combination of a complete reel equipped with a mechanically rotated double threaded shaft at its front and means for distributing a fishing line when being wound on to the spool of said reel, consisting of a line carrier moved from side to side of said reel by co-operation of one of its members with said shaft; with a line receiving end for said carrier comprising a plurality of prongs spaced openly apart at their extremities; and a line supporting rod extending across said reel between the side plates thereof, in front of its spool, and so located that the inner edges of said prongs travel on a line below its top and adjacent parts of said prongs protrude above it, for the purpose set forth.

3. The combination of a complete fishing reel of the class described; with a horizontal rod permanently attached at its ends to the head and tail plates of the reel, extending across its front, and located high enough to receive and support a fish line when drawn taut from the top of the spool of the reel to the first guide of a fishing rod, and low enough to rest below the extreme upper parts of a line carrier positioned in front of it, as described.

4. The combination with a fishing reel having a carrier adapted to wind a fish line evenly on its spool when operated, of a rod extending in front of said spool and between the side plates of the reel and having protuberances at its extremities, adjacent to said plates, higher than the top line of said carrier, as and for the purpose described.

5. The combination of a complete fishing reel; a fishing rod, a guide on said rod; mechanism for driving a member from side to side in front of the spool of said reel; a fishing line wound around said spool and passed through said rod guide, with means attached to said member for receiving and retaining said line when it is taut and capable of immediate release through a permanent opening therein when the line is slack, and a member extending from plate to plate of said reel, horizontally, between said spool and said member, above the line of departure of said line from said spool when filled to said rod guide, and below the highest part of said member, as set forth and described.

6. The combination of a fishing reel attachable to a fishing rod and a fishing line extending from said reel to a line guide on said rod, means for distributing the line on the spool of the reel when winding it in, consisting of a line carrier slidably attached to a rod extending from the head-plate to the tail-plate of said reel, and having an open top for the free entrance and exit of said line, and prongs on said top; with a horizontal bar attached at its ends to the side plates of said reel, located between its spool and said carrier and slightly below the highest points of said prongs, for the purpose set forth.

7. A horizontal rod extending from the head-plate to the tail-plate of a fishing reel and attached thereto, having elevations at its ends adjacent to said plates, and located so that its top will contact with a fishing line extending from the spool of said reel when properly filled with line, to a line guide on a fishing rod when used with said reel, for the purpose set forth.

In testimony whereof I affix my signature in presence of two witnesses.

GEORGE W. UPTON.

Witnesses:
T. J. COSTELLO,
M. G. SULLIVAN.